(12) United States Patent
Xia et al.

(10) Patent No.: US 10,756,907 B2
(45) Date of Patent: Aug. 25, 2020

(54) AUTHENTICITY VERIFICATION OF MESSAGES

(71) Applicant: INTERNATIONAL BUSINESS MACHINES CORPORATION, Armonk, NY (US)

(72) Inventors: Yin Xia, Beijing (CN); Yi Liu, Beijing (CN); Jun Su, Beijing (CN); Ying Cao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 15/869,154

(22) Filed: Jan. 12, 2018

(65) Prior Publication Data
US 2019/0222425 A1    Jul. 18, 2019

(51) Int. Cl.
*H04L 29/06* (2006.01)
*H04L 9/32* (2006.01)
*H04W 4/12* (2009.01)

(52) U.S. Cl.
CPC .......... *H04L 9/3257* (2013.01); *H04L 9/3239* (2013.01); *H04W 4/12* (2013.01); *H04L 2209/608* (2013.01)

(58) Field of Classification Search
CPC .................. H04L 9/3257; H04L 9/3239; H04L 2209/608; H04W 4/12
See application file for complete search history.

(56) References Cited

U.S. PATENT DOCUMENTS

| 7,269,622 | B2 | 9/2007 | Brown et al. |
| 7,490,132 | B1 | 2/2009 | Lyle et al. |
| 2001/0037455 | A1* | 11/2001 | Lawandy ................ G06K 7/12 713/176 |
| 2002/0170966 | A1* | 11/2002 | Hannigan ............ G06F 3/0317 235/462.01 |
| 2004/0078567 | A1 | 4/2004 | Newbould |
| 2008/0086317 | A1 | 4/2008 | Jones et al. |
| 2010/0084849 | A1* | 4/2010 | Masuda ............. G06F 16/9554 283/67 |
| 2012/0308003 | A1* | 12/2012 | Mukherjee ........... H04L 9/3247 380/243 |

(Continued)

FOREIGN PATENT DOCUMENTS

| EP | 1243999 B1 | 3/2013 |
| WO | 2004100439 A1 | 11/2004 |

OTHER PUBLICATIONS

X. Feng and X. Ji, "A Blind Watermarking Method with Strong Robust Based on 2D-Barcode," 2009 International Conference on Information Technology and Computer Science, Kiev, 2009, pp. 452-456. (Year: 2009).*

(Continued)

*Primary Examiner* — Michael R Vaughan
(74) *Attorney, Agent, or Firm* — Jordan T. Schiller (57) ABSTRACT

Embodiments of the present disclosure relate to a method for verifying an authenticity of a message. The method comprises acquiring a first hash value corresponding to the message, and acquiring a verification code corresponding to the message. The method further comprises computing a second hash value based on the verification code and the message, and verifying the authenticity of the message by comparing the first hash value with the second hash value.

14 Claims, 6 Drawing Sheets

(56) References Cited

U.S. PATENT DOCUMENTS

2014/0324927 A1 10/2014 Zhang et al.

OTHER PUBLICATIONS

Brown, "Message Authenticiation," WilliamStallings.com, http://williamstallings.com/Extras/Security-Notes/lectures/authent.html, May 22, 1996, Printed on Jan. 8, 2018, pp. 1-8.
Mell et al., "The NIST Definition of Cloud Computing," National Institute of Standards and Technology, U.S. Department of Commerce, Special Publication 800-145, Sep. 2011, pp. 1-7.

* cited by examiner

AUTHENTICITY VERIFICATION OF MESSAGES

BACKGROUND

The present invention relates to messaging processing technology and more specifically, to verifying authenticity of a message.

With the rapid development of information technology, message exchanging tools have become an essential part of people's lives. Innumerable messages are exchanged through these tools for business or personal requirements. The message can be a chat message, a web message, an e-mail message or any other message sent from a device to any other device(s), etc. The message can be a data packet sent from one messaging client to any other client(s). For example, the message can be a text message, an image message, an audio message, a video message, or any other multimedia message.

A message may sometimes be provided as electronic evidence, however proving the authenticity of a message, in practice, is the problem that the subject invention seeks to solve. The traditional way to prove the authenticity of a message is to save a copy of the message on the server side and to then compare the message, on the messaging client side, with the saved copy, on the server side, to verify the authenticity of the message on the messaging client side.

SUMMARY

According to one embodiment of the present invention, there is provided a method for verifying the authenticity of a message. According to the method, a first hash value corresponding to the message is acquired. A verification code corresponding to the message is acquired. A second hash value is computed based on the verification code and the message. An authenticity of the message is verified by comparing the first hash value with the second hash value.

According to another embodiment of the present invention, there is provided a system for verifying the authenticity of a message, the system comprising a computer processor coupled to a computer-readable memory unit, the computer-readable memory unit comprising instructions that when executed by the computer processor implements a method. According to the method, a first hash value corresponding to the message is acquired. A verification code corresponding to the message is acquired. A second hash value is computed based on the verification code and the message. An authenticity of the message is verified by comparing the first hash value with the second hash value.

According to one embodiment of the present invention, there is provided a computer program product for verifying the authenticity of a message, the computer program product comprising a computer readable storage medium having program instructions embodied therewith, the program instructions executable by a device to cause the electronic device to perform a method. According to the method, a first hash value corresponding to the message is acquired. A verification code corresponding to the message is acquired. A second hash value is computed based on the verification code and the message. An authenticity of the message is verified by comparing the first hash value with the second hash value.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
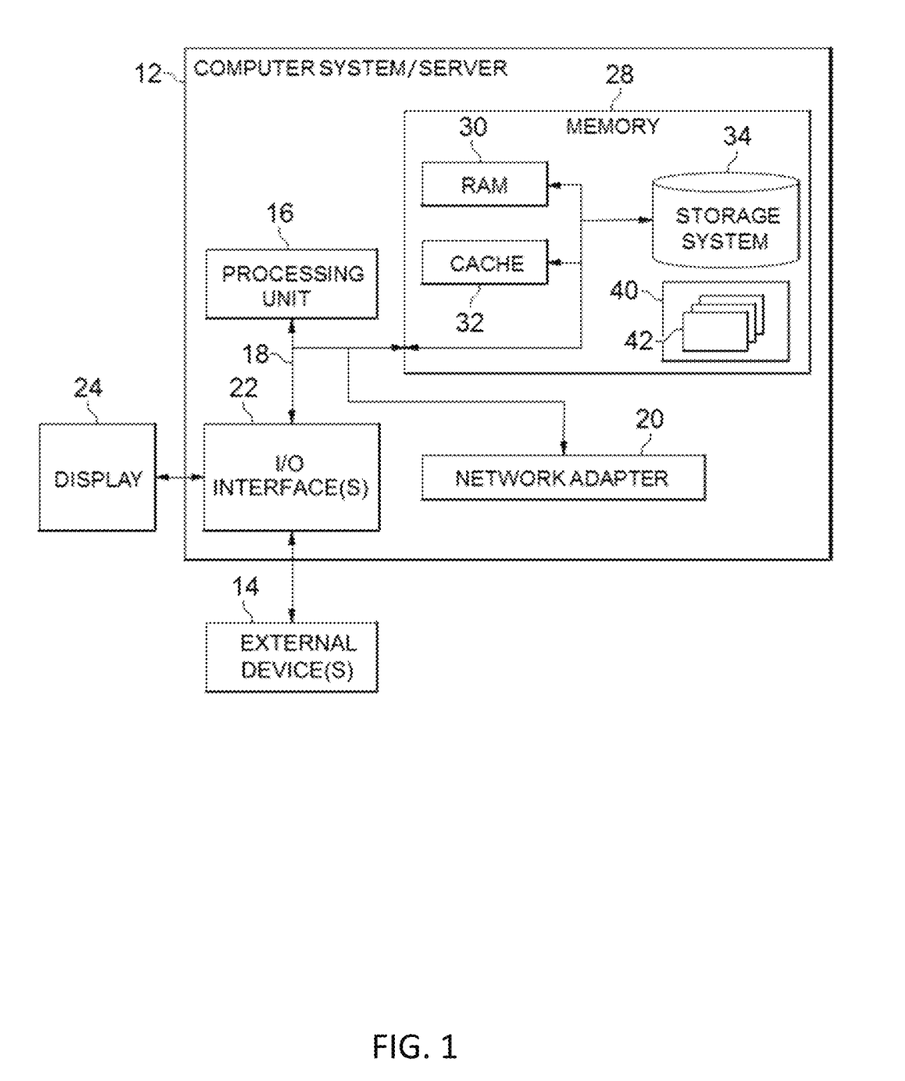
FIG. 1 depicts a cloud computing node, according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
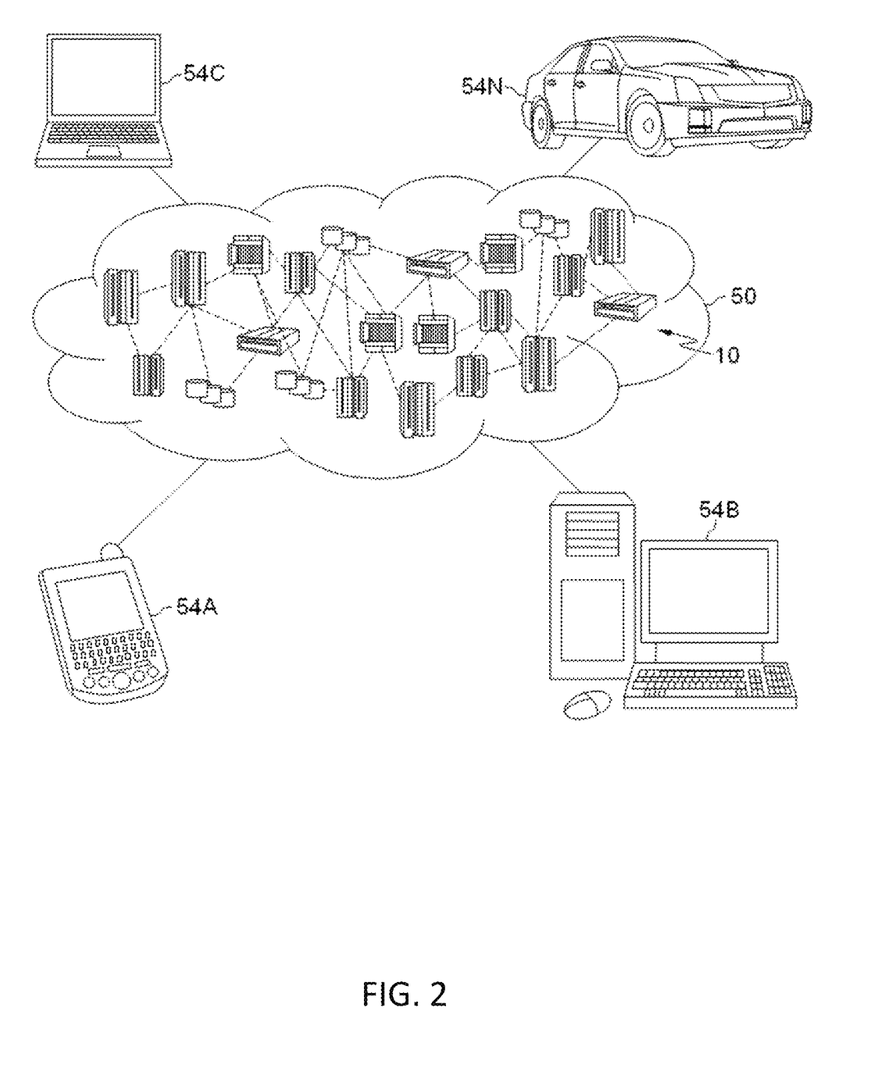
FIG. 2 depicts a cloud computing environment, according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
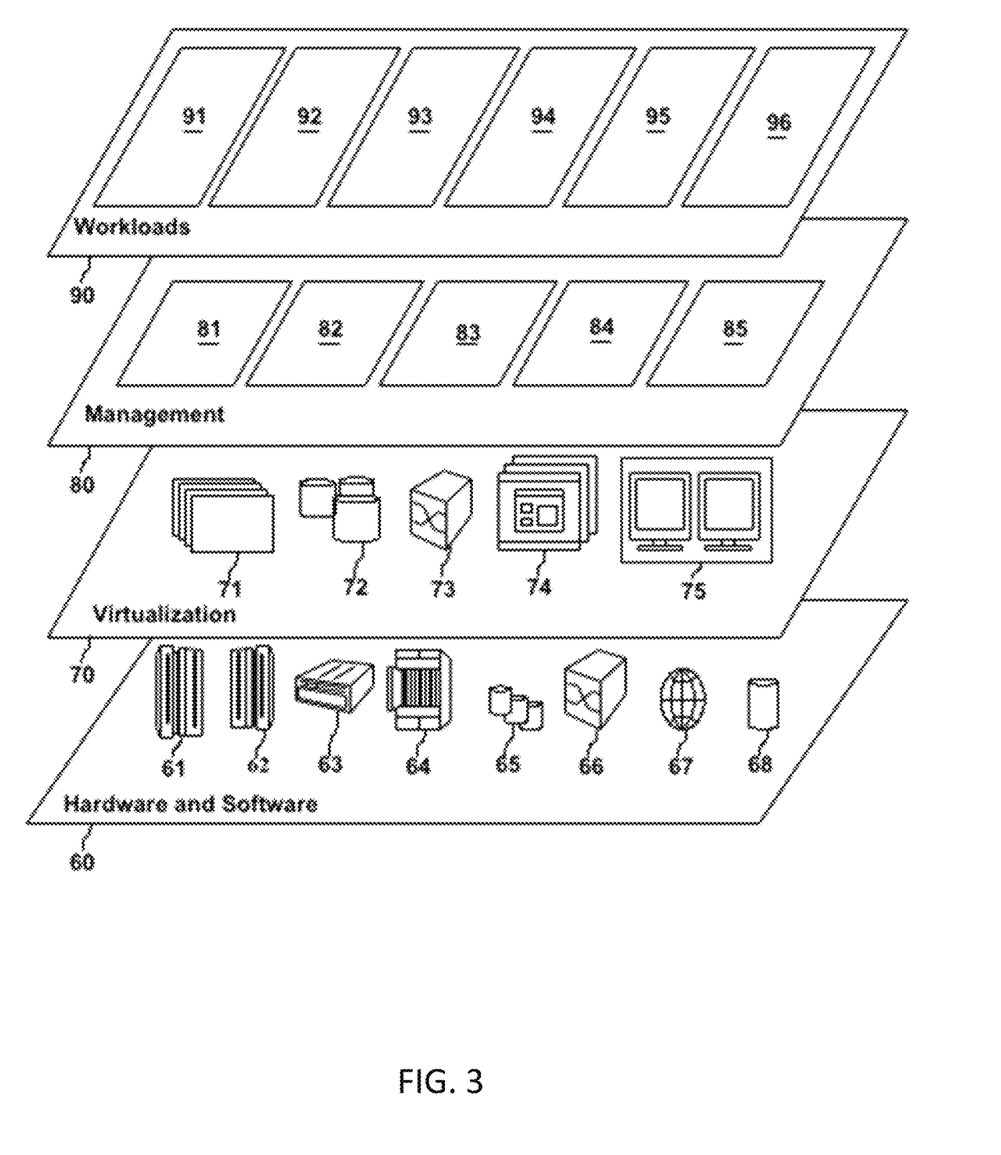
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and verification processing 96.

Nowadays, to reduce the storage consumption, a server would not save messages transferred via the server for a long time. As such, there is a need to verify authenticity of a message on a message client side without a copy on a server side.

Figure 4:
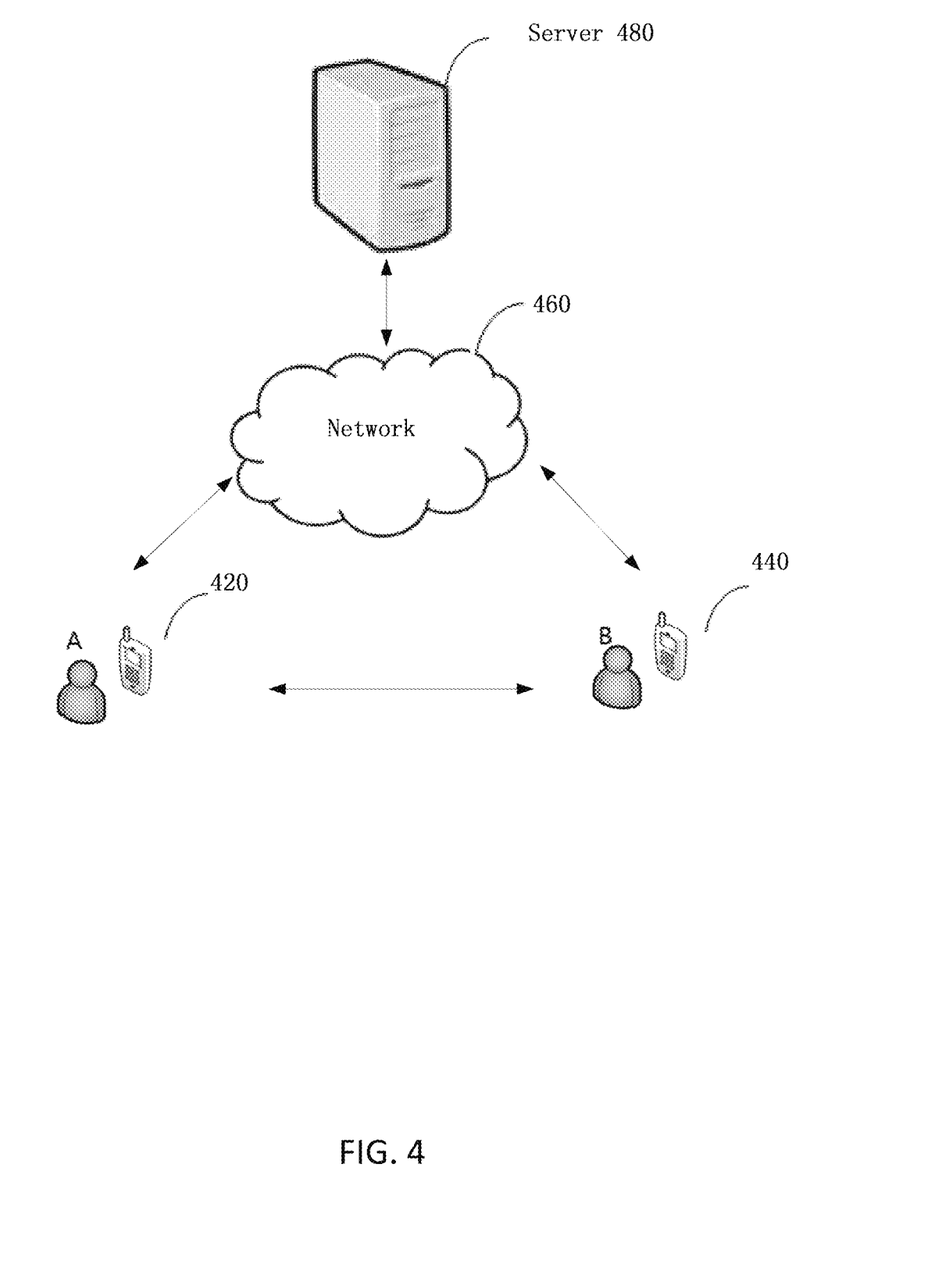
FIG. 4 depicts a general client/server environment in which message exchanging typically takes place, according to an embodiment of the present invention.

With reference now to FIG. 4, there is depicted a general client/server environment in which message exchanging typically takes place, according to an embodiment of the present invention. Herein, at least one message is transmitted between multiple users via a network. These users may use a messaging client which has installed messaging tools such as chat rooms, Internet Relay Chat (IRC), conference calling, etc. to implement real-time online communication with each other over the network. In the present disclosure, the environment comprises messaging clients 420, 440, a network 460 and server 480. The messaging client may be a smart phone, a personal digital assistant, a laptop, a notebook computer and so on.

With continued reference to FIG. 4, users A and B are communicating with each other by the messaging clients 420 and 440, respectively. Each message is transmitted from the messaging clients 420, 440 to server 480 via network 460. Server 480 then distributes the message to user A or B via network 460. According to one embodiment of the present invention, server 480 can be implemented by a computer system/server 12 in cloud computing node 10. It is to be understood that the client/server environment of the present invention is not limited to a cloud computing environment. The embodiments of the present invention are capable of being implemented with traditional client/server computing environment.

The core idea of the present disclosure provides a mechanism to guarantee the authenticity of a message without storing a copy on the server side. Upon the users sending a message to other people via their respective messaging clients, the server generates and assigns a verification code for each message, based on each message and the verification code, and implements a hash computation to get a hash value. Once the authenticity of the message needs to be verified, the hash value may be acquired. The verification code may also be acquired. Based on the acquired hash value and the acquired verification code, the authenticity of each message may be verified.

Figure 5:
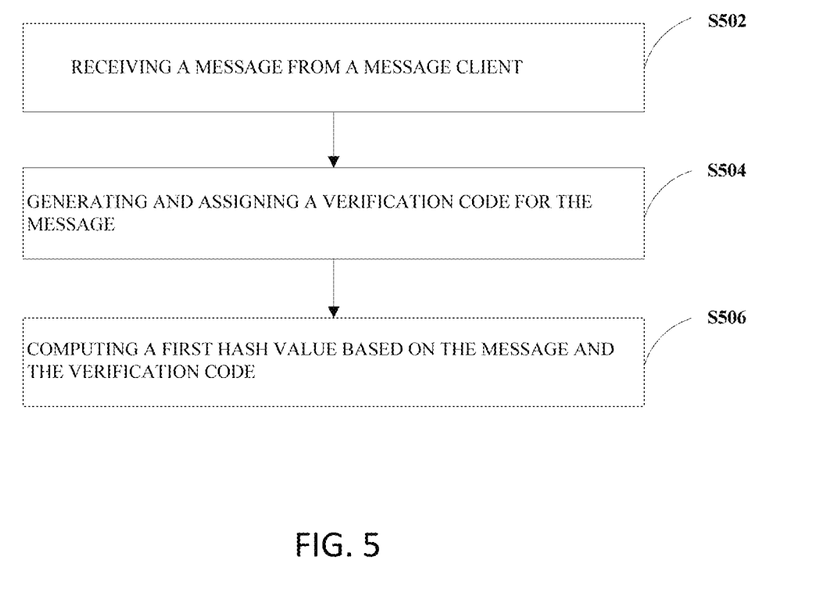
FIG. 5 is a flowchart that depicts an exemplary method for generating a hash value from an instant messaging server side, according to an embodiment of the present invention.

FIG. 5 describes an exemplary method for generating a hash value from the server side, according to an embodiment of the present invention. The server can be an instant messaging server, a chat server, an email server, a web server or any other server for transferring messages. The following will describe steps S502-S506 with reference to FIG. 5.

At step S502, a message is received from a messaging client. As cited above, the message may be a chat message, an email message, a web message, etc.

At step S504, a verification code for the message is generated. The verification code can be represented as a k-byte string V as follows:

$$V=\{v[0],v[1],v[2] \ldots v[k-2],v[k-1]\}, \text{ where } v[0],v[1] \ldots v[k-1] \text{ represent each of the characters of the string } V.$$

According to one embodiment, an identifier (ID) uniquely identifying each message is generated in the messaging client. Then the message, together with the ID, is sent from the messaging client to the server. On the server side, a randomly generated verification code can be assigned to the message. The server may maintain the corresponding relationship between the ID of the message and the verification code.

According to another embodiment, an identifier (ID) uniquely identifying each message is generated in the server after the server receives the message. Then a randomly generated verification code can be generated and assigned to the message on the server side. The server may maintain the corresponding relationship between the ID of the message and the verification code. At the same time, the corresponding relationship between the ID of the message and the verification code is sent from the server to the sender, and recipients, of the message.

According to a further embodiment, the server may send the corresponding relationship between the ID of the message and the verification code to a credit agency. The credit agency may maintain the corresponding relationship between the ID of the message and the verification code.

At step S506, a first hash value is computed based on the message and the verification code. Assuming the message is comprised of a string M, the n-byte string M may be represented as follows:

$$M=\{m[0],m[1],m[2] \ldots m[n-2],m[n-1]\}$$

Where m[0], m[1] . . . m[n−1] represent each of the characters of the string M.

The combination of string V and string M may be represented as string S, where S=V+M, $$S=\{s[0],s[1],s[2] \ldots s[n+k-2],s[n+k-1]\}$$

The first hash value may be computed as H(S), wherein H() represents a Hash function. It may be understood to one of ordinary skill in the art that any known, or to be developed, Hash algorithm may be applied to the present disclosure.

According to one embodiment, the corresponding relationship between the ID of the message and the first hash value may be maintained on the server.

According to another embodiment, the corresponding relationship between the ID of the message and the first hash value may be sent to the sender and/or recipient(s) of the message. The received corresponding relationship between the ID of the message and the first hash value can be saved as a file on the messaging client side.

According to a further embodiment, the corresponding relationship between the ID of the message and the first hash value may be sent to a credit agency. The received corresponding relationship between the ID of the message and the first hash value can be saved as a file in the credit agency.

According to an embodiment of the present disclosure, a pre-stored first hash value corresponding to the message can be acquired from any one of the following: a server, a credit agency, and a messaging agent and can then be saved as a file. The pre-stored first hash value is computed based on the message and a verification code assigned by the server on the server side, the processes of which are the same as those processes described at step S506. Then a barcode can be generated from the pre-stored first hash value. The generated barcode as a blind watermark may be embedded in the graph of the user interface for displaying the message in a messaging client. An area to embed the barcode, in the graph of the user interface for displaying the message, can be located. The barcode may then be embedded as a blind watermark in the area.

Figure 6:
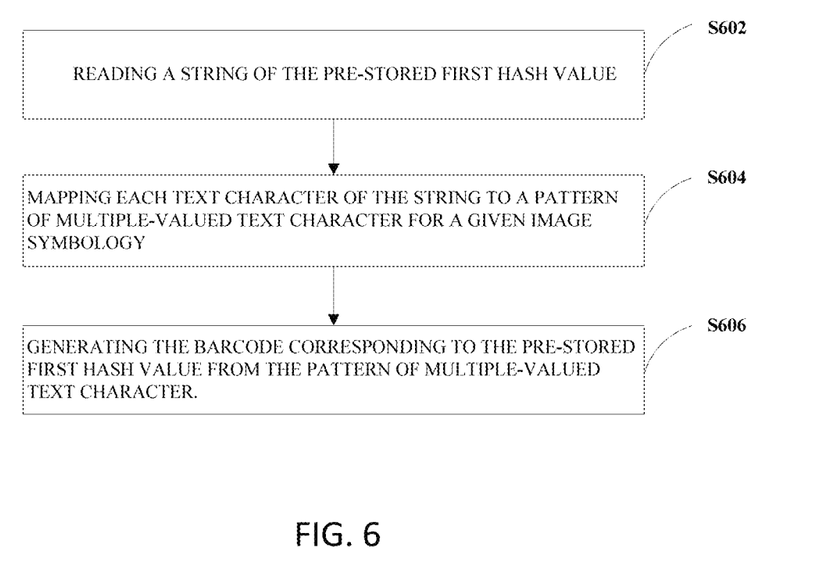
FIG. 6 is a flowchart that depicts an exemplary method for generating a barcode from a first hash value, according to an embodiment of the present invention.

There are several methods currently used for generating barcodes from the pre-stored first hash value. FIG. 6 depicts an exemplary method for generating the barcode from the first hash value, according to an embodiment of the present invention. The following will describe steps S602-S604 with reference to FIG. 6.

At step S602, a string of the pre-stored first hash value is read.

At step S604, each text character of the string is mapped to a pattern of multiple-valued text characters, for a given image symbology. For example, in an image symbology, the text character "D" may be mapped to a pattern having 11 binary-valued text characters such as ABBAABBABAA. In another image symbology, the text character "D" may be mapped to a pattern of seven 4-valued text characters such as ASDFDSA. Various image symbologies commonly used for rendering barcodes include, by way of example and not limitation, Code 39, Code 128, EAN8, ITF-14. etc. The multiple-valued text characters may represent a pattern recognizable to a user. For example, in the pattern ABBAABBABAA, A may represent a bar and B may represent a space.

At step S604, the method generates the barcode corresponding to the pre-stored first hash value from the pattern of multiple-valued text characters.

In one embodiment, in accordance with the present disclosure, the generated barcode can be embedded, as a blind watermark, in an area related to the message in the graph of the user interface for displaying the message. The area related to the message herein is not intended to suggest any limitation as to the scope of the present disclosure. The area can be anywhere in the graph of the user interface specified in advance. In one embodiment, the area may cover the whole, or part, of the content of the message. In another embodiment, the area may be adjacent to the message.

The blind watermark algorithms take advantage of characteristics of human visual systems, so that a watermark hidden in the data cannot be discerned by naked eyes. According to the domain in which the watermark is embedded, a blind watermark algorithm can be classified as a time/spatial domain algorithm, a transform domain algorithm, and/or a compression domain algorithm. In the time/spatial domain algorithm, the watermark is directly embedded in the raw carrier data such as audio, image and/or video data, that is, the ark is embedded in the media signal in time domain or spatial domain. In the transform domain algorithm, the watermark is embedded in the transform domain coefficients of raw carrier data such as audio, image and/or video. In a broad sense, the compression domain algorithm refers to embedding watermarks in a variety of variable values during a compression process while taking full account of the structure and characteristics of JPEG, MPEG and/or oilier technologies. In a narrow sense, the compression domain algorithm refers to embedding watermarks into JPEG bitstreams, MPEG bitstreams and/or VQ indexed streams.

Figure 7:
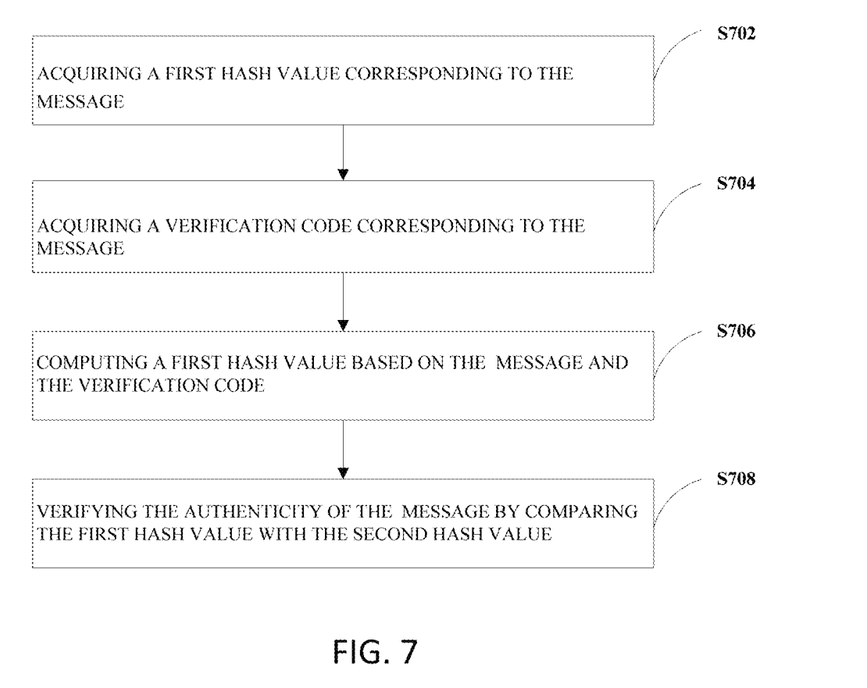
FIG. 7 is a flowchart that depicts an exemplary method for verifying the authenticity of a message, according to an embodiment of the present invention.

FIG. 7 depicts an exemplary method for verifying the authenticity of a message, according to an embodiment of the present invention. According to one embodiment of the present disclosure, this method can be implemented by a verification module in a messaging client side. The messaging client may be an instant message client, a chat client, an email client, a web client, or any other device or module suitable for sending or receiving messages, etc. According to embodiments of the present disclosure, the method can also be implemented by a verification module in another device outside of the messaging client side, for example, by a verification module in a credit agency. The following will describe steps S702-S706 with reference to FIG. 7.

At step S702, a first hash value corresponding to the message is required. According to one embodiment of the present disclosure, the first hash value is assumed to be stored on the server side. A request for verifying the authenticity of a message can be sent from the verification module to the server, wherein the request comprises an ID of the message. After receiving the request, the server can retrieve the corresponding relationship between the ID of the message and the first hash value and provide the first hash value based on the ID. Then the first hash value is sent from the server to the verification module. According to a further embodiment of the present disclosure, the server may send the corresponding relationship between the ID of the message and the first hash value to the messaging client(s) in advance. In this case, the verification module on the messaging client side can retrieve the first hash value, pre-stored on the messaging client side, using the ID of the message.

According to another embodiment of the present disclosure, the verification module can be implemented in the credit agency. The credit agency can send the request comprising an ID of the message to the server and receive the first hash value from the server. According to a further embodiment of the present disclosure, the server may send the corresponding relationship between the ID of the message and the first hash value to the messaging client(s) in advance. In this case, the verification module in the credit agency can also acquire the first hash value pre-stored on the messaging client side using the ID of the message.

Figure 8:
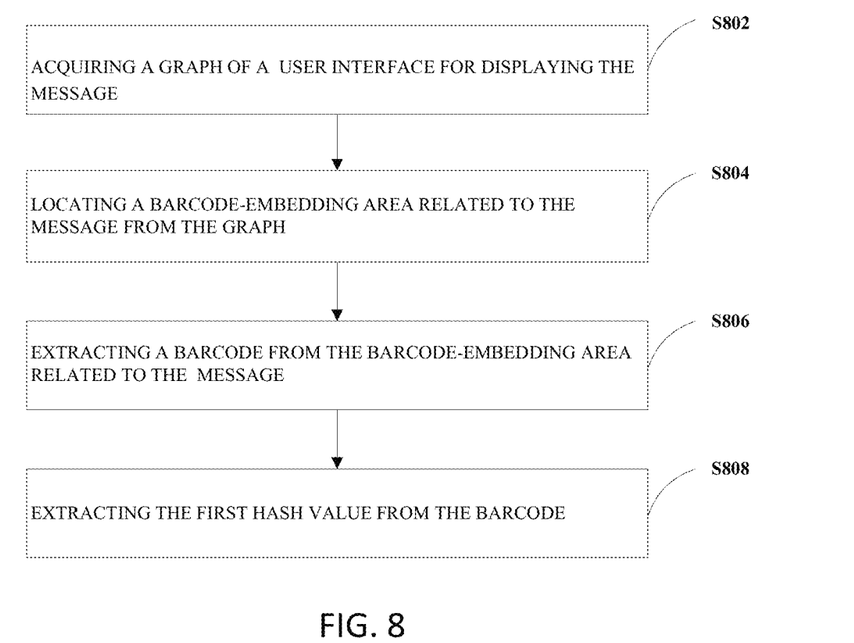
FIG. 8 is a flowchart that depicts an exemplary method for acquiring a first hash value from a graph of a user interface, according to an embodiment of the present invention.

A message is usually saved as electronic evidence in the form of a graph of a user interface for displaying the message, such as a snapshot. According to the steps S602-S604 described above, a barcode can be generated from the pre-stored first hash value. Then the generated barcode can be embedded in the graph of the user interface for displaying the message as a blind watermark in a messaging client. So the first hash value can be acquired from a graph of a user interface for displaying the message. FIG. 8 depicts an exemplary method for acquiring the first hash value from a graph of a user interface, according to an embodiment of the present invention. The following will describe steps S802-S808 with reference to FIG. 8.

At step S802, a graph of the user interface for displaying the message from a messaging client is acquired. At step S804, a barcode-embedding area related to the message from the graph is located. At step S806, a barcode is extracted from the barcode-embedding area related to the message. At step S808, the first hash value is extracted from the barcode.

There are existing various blind watermark embedding algorithms to embed a barcode in an area in the graph of the user interface for displaying the message. The following shows an exemplary barcode embedding/extracting method, in accordance with the present disclosure. The method comprises the following steps:

At step S1, a two-valued sequence of a barcode and a graph of a user interface for displaying the message is acquired.

At step S2, the two-valued sequence of the barcode is scrambled. There are many image scrambling methods, such as Arnode transform, Hilbert curve, Gray code, etc.

At step S3, a Discrete Cosine Transform (DCT) is applied to the graph of the user interface for displaying the message and a coefficient matrix C can be obtained according to the following formula:

$$C=\{c(i,j), 0 \le i < J, 0 \le j < K\}, \text{ wherein } J \text{ represents the length of the graph, and } K \text{ represents the width of the graph.}$$

At step S4, the area in the graph to be embedded with the barcode is located. Some coefficients are selected to embed the barcode. The quantity of these coefficients may be the same as the length of the two-valued sequence of the barcode.

At step S5, a new coefficient matrix C' can be obtained by quantifying these coefficients based on the value of the barcode.

At step S6, the barcode in the area can be embedded by applying an Inverse Discrete Cosine Transform (IDCT) to the new coefficient matrix C'.

Now, a barcode-embedding area related to the message in a user interface for displaying the message is acquired. The barcode extracting process is the reverse of the barcode embedding process, which comprises the following steps:

At step S7, a Discrete Cosine Transform (DCT) is applied to the graph of the user interface for displaying the message with the barcode-embedding area.

At step S8, the barcode-embedding area in the graph is located.

At step S9, the two-valued sequence of the barcode is extracted from the barcode-embedding area.

At step S10, resumption is scrambled for the extracted two-valued sequence of the barcode. Finally, the original two-valued sequence of the barcode is acquired.

This barcode embedding/extracting method is exemplary but not intended to suggest any limitation as to the scope of the present disclosure. A message may include communications such as voice, video, and text transmissions between multiple users. In the time/spatial domain algorithm, the barcode as watermark can be directly embedded in the raw carrier data such as voice and video. It is understood to one of ordinary skill in the art that any known or future emerging blind watermark embedding/extracting technology may be applied to the present disclosure.

Then, the first hash value can be extracted from the barcode by reversing the processes for generating a barcode in accordance with the present disclosure shown in FIG. 6, which is omitted here. According to one embodiment of the present disclosure, the barcode embedding/extracting method can be implemented as a module in the messaging client. By this method, it is not necessary to store the first hash value in the messaging client, the server, or the credit agency. The barcode extracting method may be implemented in the device other than the messaging client. It is more flexible to implement the authentication verification of the message.

In S704, a verification code corresponding to the message can be acquired. According to one embodiment of the present disclosure, the verification code is assumed to be stored on the server side. A request for verifying the authenticity of a message is sent from the verification module to the server, wherein the request comprises an ID of the message. After receiving the request, the server can retrieve the corresponding relationship between the ID of the message and the verification code and provide the proper verification code based on the ID. The verification code is then sent from the server to the verification module. According to another embodiment of the present disclosure, the corresponding relationship between the ID of the message and the verification code is maintained in the credit agency, so that the verification module, on the messaging client side, can send the request comprising an ID of the message to the credit agency and receive the verification code from the credit agency.

It is to be understood that although S702 is depicted prior to S704, this is merely for the purpose of illustration without suggesting any limitation as to the execution sequence of S702 and S704. In some embodiments, S702 and S704 can be carried out in parallel, or S704 can be prior to S702.

At S706, a second hash value is computed based on the verification code and the message. It should be noted, the Hash algorithm for obtaining the second hash value should be the same as that for obtaining the first hash value described at S506. The processes of computing a second hash value can be similar to those processes described at S506.

At S708, the authenticity of the message is verified by comparing the first hash value with the second hash value. In response to the second hash value being equal to the first hash value, the message is verified to be authenticated. In response to the second hash value not being equal to the first hash value, the message is verified to not be authenticated.

According to the embodiments of the present disclosure, it is not necessary for the server to save the copy of the message but just save the corresponding relationship between the ID of the message and the corresponding verification code, which may save storage space on the server. With irreversible hash computation, the verification result can be credible.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for verifying an authenticity of one or more messages in a chat session, comprising:
    acquiring a first hash value corresponding to each of the one or more messages, wherein acquiring the first hash value corresponding to each of the one or more messages further comprises:
        acquiring a graph of a user interface for displaying the one or more messages;
        locating, from the graph, a barcode-embedding area related to the one or more messages;
        extracting, from the barcode-embedding area related to the one or more messages, a barcode; and
        extracting, from the barcode, the first hash value;
    acquiring a verification code corresponding to each of the one or more messages;
    acquiring a pre-stored first hash value corresponding to each of the one or more messages, wherein the pre-sorted first hash value is computed based on each of the one or more messages and the verification code assigned by a messaging server;
    generating a barcode corresponding to each of the one or more messages, based on the pre-stored first hash value;
    locating a barcode-embedding area, related to each of the one or more messages, in the graph of the user interface for displaying each of the one or more messages in the chat session;
    embedding the barcode as a blind watermark in the area;
    computing a second hash value based on the verification code and each of the one or more messages; and
    verifying the authenticity of each of the one or more messages, in the chat session, by comparing the first hash value with the second hash value of each of the one or more messages.

2. The computer-implemented method of claim 1, wherein the first hash value and the verification code are acquired based on an ID of each of the one or more messages.

3. The computer-implemented method of claim 1, wherein verifying the authenticity of each of the one or more messages further comprises:
    in response to the second hash value being equal to the first hash value, the message is verified to be authenticated; and
    in response to the second hash value not being equal to the first hash value, the message is verified to not be authenticated.

4. The computer-implemented method of claim 1, wherein the pre-stored first hash value corresponding to each of the one or more messages is acquired from any of the following: a server, a credit agency, and a messaging agent, and wherein the pre-stored first hash value is computed based on each of the one or more messages and an assigned verification code.

5. The computer-implemented method of claim 1, wherein generating the barcode based on the pre-stored hash value further comprises:
    reading a string of the pre-stored hash value;

mapping each text character of the string to a pattern of multiple-valued text characters; and
generating the barcode corresponding to the pre-stored first hash value according to the pattern of multiple-valued text characters.

6. A computer system, comprising:
one or more computer devices each having one or more processors and one or more tangible storage devices; and
a program embodied on at least one of the one or more storage devices, the program having a plurality of program instructions for execution by the one or more processors, the program instructions comprising instructions for:
acquiring a first hash value corresponding to each of the one or more messages, wherein acquiring the first hash value corresponding to each of the one or more messages further comprises:
acquiring a graph of a user interface for displaying the one or more messages;
locating, from the graph, a barcode-embedding area related to the one or more messages;
extracting, from the barcode-embedding area related to the one or more messages, a barcode; and
extracting, from the barcode, the first hash value;
acquiring a verification code corresponding to each of the one or more messages;
acquiring a pre-stored first hash value corresponding to each of the one or more messages, wherein the pre-sorted first hash value is computed based on each of the one or more messages and the verification code assigned by a messaging server;
generating a barcode corresponding to each of the one or more messages, based on the pre-stored first hash value;
locating a barcode-embedding area, related to each of the one or more messages, in the graph of the user interface for displaying each of the one or more messages in the chat session;
embedding the barcode as a blind watermark in the area;
computing a second hash value based on the verification code and each of the one or more messages; and
verifying the authenticity of each of the one or more messages, in the chat session, by comparing the first hash value with the second hash value of each of the one or more messages.

7. The computer system of claim 6, wherein the first hash value and the verification code are acquired based on an ID of each of the one or more messages.

8. The computer system of claim 6, wherein verifying the authenticity of each of the one or more messages further comprises:
in response to the second hash value being equal to the first hash value, the message is verified to be authenticated; and
in response to the second hash value not being equal to the first hash value, the message is verified to not be authenticated.

9. The computer system of claim 6, wherein the pre-stored first hash value corresponding to each of the one or more messages is acquired from any of the following: a server, a credit agency, and a messaging agent, and wherein the pre-stored first hash value is computed based on each of the one or more messages and an assigned verification code.

10. The computer system of claim 6, wherein generating the barcode based on the pre-stored hash value further comprises:
reading a string of the pre-stored hash value;
mapping each text character of the string to a pattern of multiple-valued text characters; and
generating the barcode corresponding to the pre-stored first hash value according to the pattern of multiple-valued text characters.

11. A computer program product for verifying an authenticity of a message, the computer program product comprising a computer readable storage medium having program instructions embodied therewith, the program instructions executable by a device to cause the electronic device to perform a method comprising:
acquiring a first hash value corresponding to each of the one or more messages, wherein acquiring the first hash value corresponding to each of the one or more messages further comprises:
acquiring a graph of a user interface for displaying each of the one or more messages;
locating, from the graph, a barcode-embedding area related to each of the one or more messages;
extracting, from the barcode-embedding area related to each of the one or more messages, a barcode; and
extracting, from the barcode, the first hash value;
acquiring a verification code corresponding to each of the one or more messages;
acquiring a pre-stored first hash value corresponding to each of the one or more messages, wherein the pre-sorted first hash value is computed based on each of the one or more messages and the verification code assigned by a messaging server;
generating a barcode corresponding to each of the one or more messages, based on the pre-stored first hash value;
embedding the barcode as a blind watermark in the barcode-embedding area related to the one;
computing a second hash value based on the verification code and each of the one or more messages; and
verifying the authenticity of each of the one or more messages, in the chat session, by comparing the first hash value with the second hash value of each of the one or more messages.

12. The computer program product of claim 11, wherein the first hash value and the verification code are acquired based on an ID of each of the one or more messages.

13. The computer program product of claim 11, wherein verifying the authenticity of each of the one or more messages further comprises:
in response to the second hash value being equal to the first hash value, the message is verified to be authenticated; and
in response to the second hash value not being equal to the first hash value, the message is verified to not be authenticated.

14. The computer program product of claim 11, wherein generating a barcode from the pre-stored first hash value further comprises:
reading a string of the pre-stored first hash value;
mapping each text character of the string to a pattern of multiple-valued text characters; and
generating the barcode corresponding to the pre-stored first hash value according to the pattern of multiple-valued text characters.

* * * * *